United States Patent
Kyhl et al.

(10) Patent No.: US 11,678,056 B2
(45) Date of Patent: Jun. 13, 2023

(54) TORSIONAL FLEXURE FOR DEROLL CONTROLLERS

(71) Applicant: Raytheon Company, Waltham, MA (US)

(72) Inventors: Curtis Kyhl, Lewisville, TX (US); Sean Thomas, Mckinney, TX (US)

(73) Assignee: Raytheon Company, Waltham, MA (US)

( * ) Notice: Subject to any disclaimer, the term of this patent is extended or adjusted under 35 U.S.C. 154(b) by 24 days.

(21) Appl. No.: 17/352,463

(22) Filed: Jun. 21, 2021

(65) Prior Publication Data

US 2022/0408023 A1  Dec. 22, 2022

(51) Int. Cl.
*H04N 23/68* (2023.01)
*H02K 7/116* (2006.01)
(Continued)

(52) U.S. Cl.
CPC ........... *H04N 23/687* (2023.01); *H02K 7/116* (2013.01); *H02K 11/33* (2016.01); *H02K 29/06* (2013.01);
(Continued)

(58) Field of Classification Search
CPC ............................ H04N 5/23287; H02K 7/116
See application file for complete search history.

(56) References Cited

U.S. PATENT DOCUMENTS

| | | |
|---|---|---|
| 5,897,223 A | 4/1999 | Tritchew et al. |
| 6,256,057 B1 | 7/2001 | Mathews et al. |

(Continued)

FOREIGN PATENT DOCUMENTS

| | | |
|---|---|---|
| JP | 4302625 | 7/2009 |
| JP | 2010128386 | 6/2010 |

(Continued)

OTHER PUBLICATIONS

Y. Wang, Y. Chen, K. Chen, Y. Wu and Y. Huang, "A flat torsional spring with corrugated flexible units for series elastic actuators," 2017 2nd International Conference on Advanced Robotics and Mechatronics (ICARM), 2017, pp. 138-143, doi: 10.1109/ICARM.2017.8273149. (Year: 2017).*

(Continued)

*Primary Examiner* — Noam Reisner
(74) *Attorney, Agent, or Firm* — Renner, Otto, Boisselle & Sklar, LLP

(57) ABSTRACT

A deroll control system includes an outer housing, a detector configured to capture an image, an annular torsional flexure, at least one drive and a controller configured to control the at least one drive. The annular torsional flexure has a rotatable inner mount surface to which the detector is mounted, a fixed outer mount surface fixed to the outer housing and spaced radially apart from the rotatable inner mount surface, and a flexure region having a plurality of flexures spaced radially between the inner mount surface and the outer mount surface. The at least one drive is coupled to the inner mount surface of the torsional flexure and is configured to cause a counter-rotation of the inner mount surface and the detector about a central rotational axis perpendicular to an image plane to correct a rotation of the image as the detector is capturing the image.

20 Claims, 6 Drawing Sheets

(51) Int. Cl.
    *H02P 6/16*           (2016.01)
    *H04N 23/54*       (2023.01)
    *H02K 11/33*       (2016.01)
    *H02K 29/06*       (2006.01)
    *H04N 23/52*       (2023.01)

(52) U.S. Cl.
    CPC ............... *H02P 6/16* (2013.01); *H04N 23/52* (2023.01); *H04N 23/54* (2023.01)

(56) References Cited

U.S. PATENT DOCUMENTS

| | | | |
|---|---|---|---|
| 6,477,326 | B1 | 11/2002 | Partynski et al. |
| 7,136,726 | B2 | 11/2006 | Greenfeld et al. |
| 2004/0160118 | A1 | 8/2004 | Knollenberg et al. |
| 2008/0204908 | A1 | 8/2008 | Blanding et al. |
| 2009/0160951 | A1 | 6/2009 | Anderson et al. |
| 2013/0155262 | A1 | 6/2013 | Katoh et al. |
| 2014/0226223 | A1 | 8/2014 | Bremer et al. |
| 2020/0099323 | A1* | 3/2020 | Luedtke ................... H02P 21/24 |
| 2021/0329170 | A1* | 10/2021 | Osaka ...................... G02B 7/02 |

FOREIGN PATENT DOCUMENTS

| | | |
|---|---|---|
| JP | 2013257519 | 12/2013 |
| JP | 2013257519 A * | 12/2013 |

OTHER PUBLICATIONS

International Search Report and Written Opinion dated May 6, 2022 in corresponding International Application No. PCT/US2022/011230.

* cited by examiner

TORSIONAL FLEXURE FOR DEROLL CONTROLLERS

TECHNICAL FIELD

The present disclosure relates generally to imaging systems and more particularly to a deroll control system used in scanning applications of an imaging system.

BACKGROUND

During scanning applications in imaging systems, such as electro-optical/infra-red (EO/IR) systems, voluntary and/or involuntary movement may occur, and therefore an image generated by the system may roll with respect to the starting position during the integration time of the sensors. For example, this may occur due to gross adjustments such as when an outer gimbal moves to compensate for the platform's movement over a long period of time, or may occur due to fine adjustments when fast steering mirrors are used to back scan during integration times. Such unwanted roll motion during the integration time of the sensors can negatively affect the performance of the system by resulting in a blurred image, for example.

Deroll controllers have been used in EO/IR systems, for example, to allow for the correction of image rotation that is in plane with the focal plane array (FPA). Various methods of deroll control have used back scanning, vibration, platform motion and many other solutions. For example, one prior solution involves mounting the entire sensor assembly on a bearing and motor set that counter rotates the sensor in the direction so as to cancel out the induced image roll. This solution, however, requires a lot of parts and repeated alignment adjustments in order to maintain position and tilt accuracy through the rotation. Additionally, the return rate of the sensor between integration times is reliant on the drive mechanism to return the sensor to its normal position. Another solution involves using two fast steering mirrors in tandem to offset the roll induced while back scanning, however not every optical prescription allows for this solution and performance can be limited by the fast steering mirror's capabilities. Finally, other solutions involve electronic image rotation, however the entire FPA is not always fully utilized in the rotational state and this solution does not correct for all movement and jitter.

SUMMARY

To solve the aforementioned problems associated with the above described prior solutions, a deroll control system for correcting a rotation of an image generated by an imaging system involves mounting a sensor on a controllable torsional flexure that allows rotation of the sensor about the image plane but keeps the sensor stiff in the tilt directions. The flexure is attached to a motor that allows the rotation of the sensor to be controlled in position and rate accurately. The sensor is hard mounted to the flexure instead of with a bearing. Accordingly, mounting tolerances are greatly reduced and easier to control while still allowing the rotational control that can be used to offset the induced image roll. Rather than relying on a motor or other driving mechanism to return the sensor to its nominal, resting position between integration times, the torsional flexure allows for a faster return of the sensor to its nominal, resting position, allowing for an increased frame rate and additional time for other processes of the assembly to take place. This solution allows for rotational correction of any optical prescription, as it is not designed into the optical path and instead simply involves the sensor mounting scheme.

According to an aspect of this disclosure, a deroll control system includes an outer housing, a detector configured to capture an image, an annular torsional flexure, at least one drive and a controller configured to control the at least one drive. The annular torsional flexure has a rotatable inner mount surface to which the detector is mounted, a fixed outer mount surface fixed to the outer housing and spaced radially apart from the rotatable inner mount surface, and a flexure region having a plurality of flexures spaced radially between the inner mount surface and the outer mount surface. The at least one drive is coupled to the inner mount surface of the torsional flexure and is configured to cause a counter-rotation of the inner mount surface and the detector about a central rotational axis to correct a rotation of the image as the detector is capturing the image. The central rotational axis is perpendicular to an image plane of the detector.

According to an embodiment of any paragraph(s) of this summary, the deroll control system further includes a position feedback coupled to the at least one drive and configured to at least one of monitor and adjust the counter-rotation of the inner mount surface and the detector.

According to another embodiment of any paragraph(s) of this summary, the at least one drive includes a gear train and a gear train motor.

According to another embodiment of any paragraph(s) of this summary, a terminal gear of the gear train is fixed to the inner mount surface of the annular torsional flexure.

According to another embodiment of any paragraph(s) of this summary, the at least one drive includes a direct drive motor.

According to another embodiment of any paragraph(s) of this summary, the direct drive motor includes a stator fixed to the outer housing and a rotor fixed to the inner mount surface of the annular torsional flexure.

According to another embodiment of any paragraph(s) of this summary, the position feedback includes a resolver built into the at least one drive and configured to measure a degree of the counter-rotation of the inner mount surface and the detector by the at least one drive.

According to another embodiment of any paragraph(s) of this summary, the at least one drive includes an electric linear actuator.

According to another embodiment of any paragraph(s) of this summary, the electric linear actuator includes a copper coil fixed to the outer housing and a plurality of permanent magnets fixed to a bracket that is fixed to the inner mount surface of the annular torsional flexure.

According to another embodiment of any paragraph(s) of this summary, the position feedback includes at least one eddy current sensor fixed to the outer housing.

According to another embodiment of any paragraph(s) of this summary, the detector is a camera having a window parallel to the image plane.

According to another embodiment of any paragraph(s) of this summary, the inner mount surface, the outer mount surface and the flexure region having the plurality of flexures are configured as a single integral piece.

According to another aspect of this disclosure, a method of correcting a rotation of an image captured by a detector as the detector is capturing the image includes providing a deroll control system. The deroll control system includes an annular torsional flexure having a rotatable inner mount surface to which the detector is mounted, a fixed outer mount surface fixed to an outer housing and spaced radially apart from the rotatable inner mount surface, and a flexure region having a plurality if flexures spaced radially between the inner mount surface and the outer mount surface. The deroll control system further includes at least one drive coupled to the inner mount surface of the torsional flexure and a controller configured to control the at least one drive. The method further includes counter-rotating, via the at least one drive, the inner mount surface of the annular torsional flexure and the detector about a central rotational axis. The central rotational axis is perpendicular to an image plane of the detector.

According to an embodiment of any paragraph(s) of this summary, the method further includes monitoring the counter-rotating of the inner mount surface of the annular torsional flexure and the detector with a position feedback coupled to the at least one drive.

According to another embodiment of any paragraph(s) of this summary, the method further includes adjusting the counter-rotating of the inner mount surface of the annular torsional flexure and the detector with the position feedback coupled to the at least one drive.

According to another embodiment of any paragraph(s) of this summary, the counter-rotating includes rotating the inner mount surface of the annular torsional flexure and the detector with a gear train and a gear train motor, wherein a terminal gear of the gear train is fixed to the inner mount surface of the annular torsional flexure.

According to another embodiment of any paragraph(s) of this summary, the counter-rotating includes rotating the inner mount surface of the annular torsional flexure and the detector with a direct drive motor, wherein a stator of the direct drive motor is fixed to the outer housing and a rotor of the direct drive motor is fixed to the inner mount surface of the annular torsional flexure.

According to another embodiment of any paragraph(s) of this summary, the monitoring the counter-rotating of the inner mount surface of the annular torsional flexure and the detector with the position feedback includes measuring a degree of the counter-rotation of the inner mount surface and the detector with a resolver built into the at least one drive.

According to another embodiment of any paragraph(s) of this summary, the counter-rotating includes rotating the inner mount surface of the annular torsional flexure and the detector with an electric linear actuator, wherein a copper coil is fixed to the outer housing and a plurality of permanent magnets are fixed to a bracket that is fixed to the inner mount surface of the annular torsional flexure.

According to another embodiment of any paragraph(s) of this summary, the monitoring the counter-rotating of the inner mount surface of the annular torsional flexure and the detector with the position feedback includes measuring eddy currents of the electric linear actuator with at least one eddy current sensor fixed to the outer housing.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

According to a general embodiment, a deroll control system includes a controllable torsional flexure mounted to a detector and a motor for correcting a rotation of an image generated by the detector. Specifically, the torsional flexure allows for rotation of the detector in the image plane (i.e., a plane of the focal plane array of the detector) to correct for induced image rotation as the detector is capturing the image. The rotation of the detector may be controlled using various motor and control feedbacks, while the return of the detector to its nominal position between frames may be automatically achieved by a return force of the torsional flexure. In this manner, the deroll control system disclosed herein can be used with any optical prescription used for the detector, can be used to correct for fine adjustments (also referred to herein as "jitter"), and requires a less complex assembly allowing for tighter tolerances over rotation angles.

Figure 1:
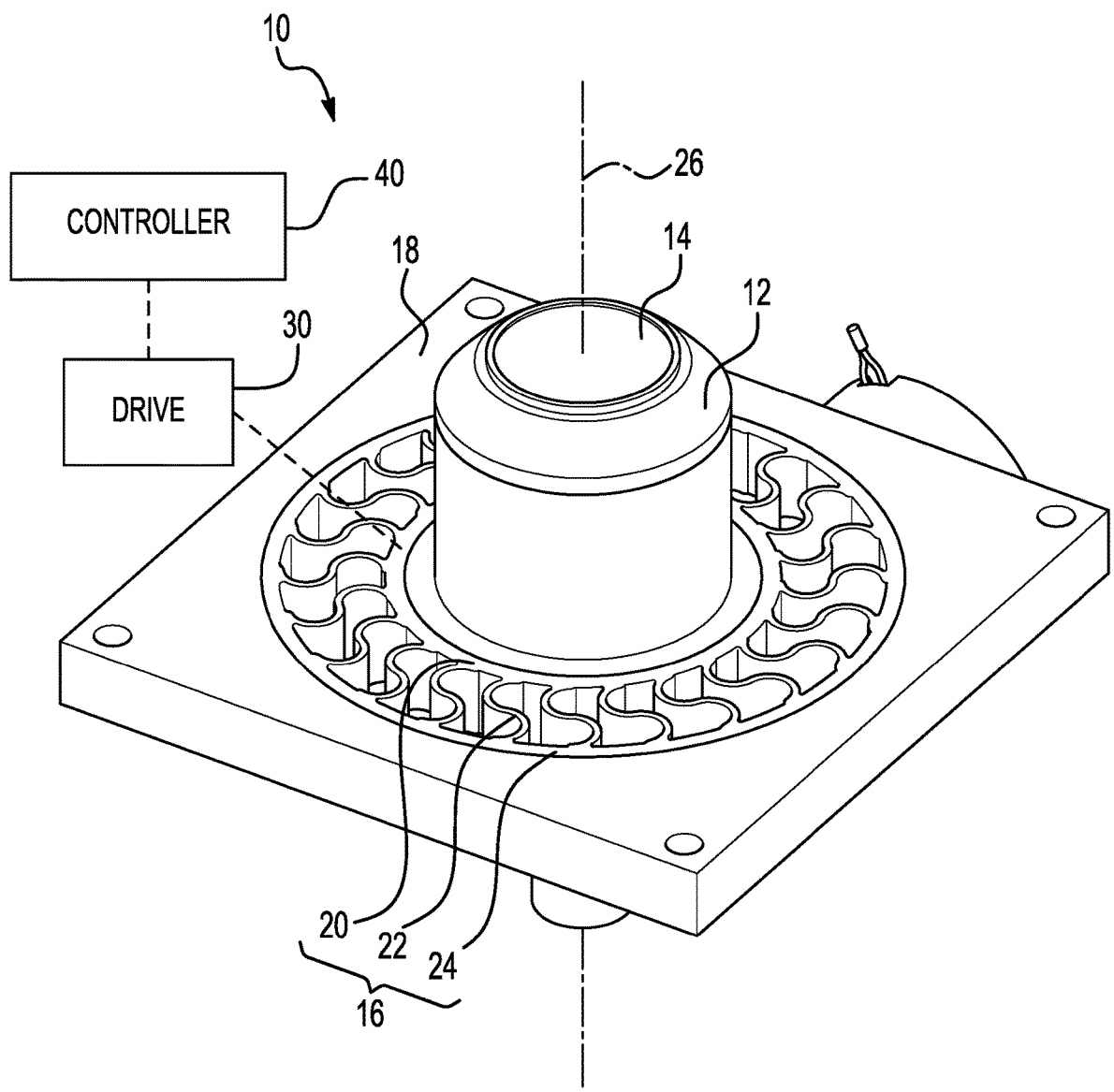
FIG. 1 is a perspective view of an exemplary deroll control system.
Figure 2:
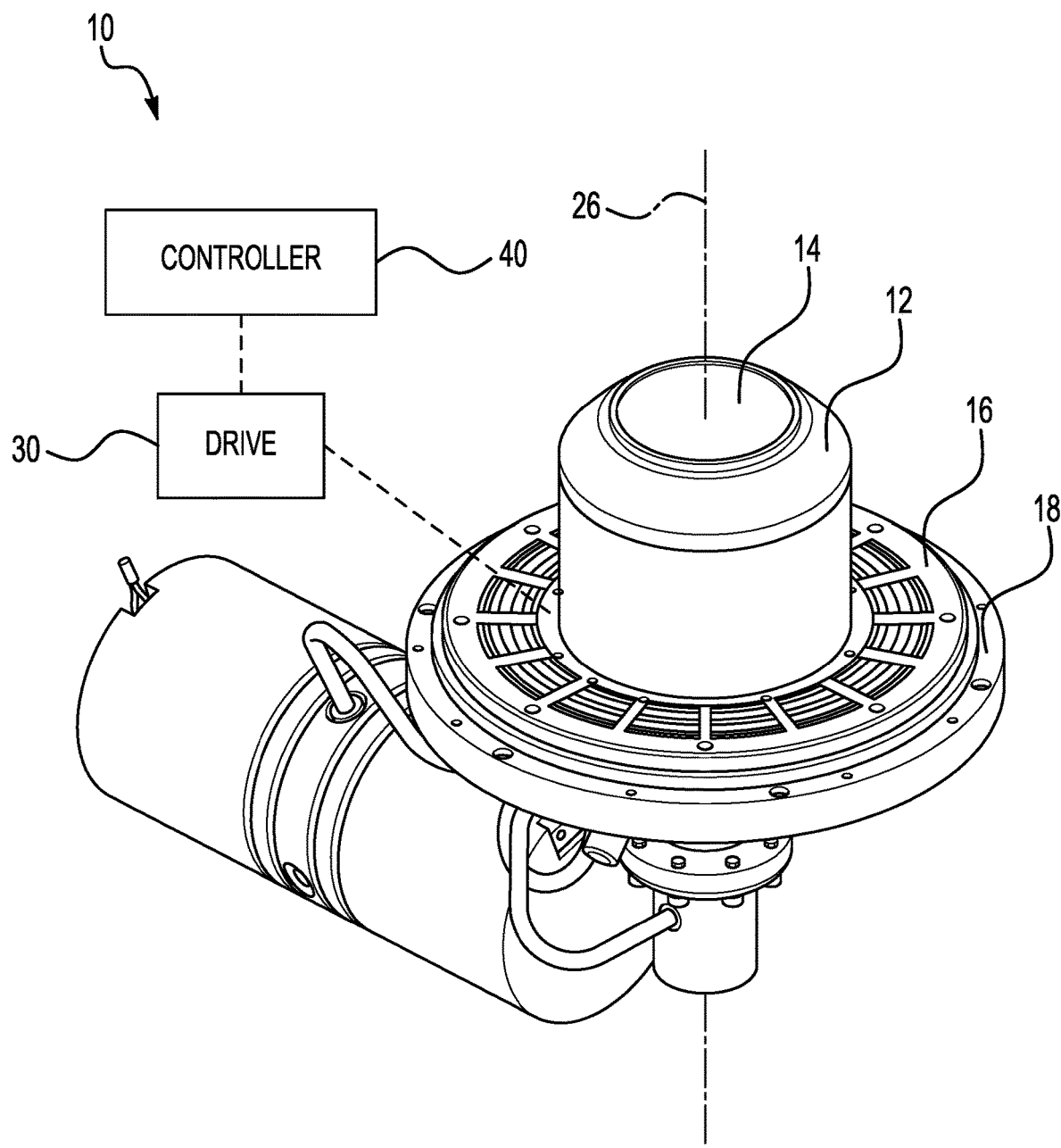
FIG. 2 is another perspective view of the exemplary deroll control system of FIG. 1.

Turning now to the figures and initially to FIGS. 1 and 2, an exemplary deroll control system 10 is depicted. The deroll control system 10 includes a detector 12 configured to capture an image. The detector 12 may be, for example, a camera including a window 14 that is parallel to an image plane (i.e., parallel to a plane of the focal plane array). The detector 12 is mounted to an annular torsional flexure 16 which is mounted within a housing 18 of the deroll control system 10. The annular torsional flexure 16 includes an inner mount surface 20 to which the detector 12 is hard mounted, and an outer mount surface 24 spaced radially apart from the inner mount surface 20. The outer mount surface 24 of the annular torsional flexure 16 is hard mounted to the housing 18. A plurality of flexures 22 is disposed radially between the inner mount surface 20 and the outer mount surface 24 of the annular torsional flexure 16. The plurality of flexures 22 may include, for example, between 2 to 50 flexures, depending on the size and dimensions of the annular torsional flexure 16. The plurality of flexures 22 may be made of at least one of titanium, steel, or other suitable metals and may be configured to allow for an angular rotation in the range of, for example, 0 to 3 degrees.

The size and dimensions of the annular tortional flexure 16 and each of the plurality of flexures 22 therein will be dependent on the particular design and application in which they are used. As non-limited examples, the inner diameter of the annular torsional flexure 16 may be in a range of 2.54 cm to 15.24 cm, 5.08 cm to 12.70 cm, or 7.62 cm to 10.16 cm. The outer diameter of the annular torsional flexure 16 may be in a range of 5.08 cm to 25.40 cm, 7.62 cm to 22.86 cm, 10.16 cm to 20.32 cm, or 12.7 cm to 17.78 cm. The inner mount surface 20 and the outer mount surface 24 may each have a thickness in a range of 0.25 cm to 5.08 cm, 1.27 cm to 4.45 cm, or 2.54 cm to 3.81 cm. As a non-limiting example, a thinnest portion of each of the plurality of flexures 22 may be in a range of 0.013 cm to 0.25 cm. Each of the plurality of flexures 22 may be spaced apart from each other a distance in a range of 0.05 cm to 0.76 cm. All foregoing sizes and dimensions of the annular torsional flexure are provided as non-limiting examples and it is understood that other sizes and dimensions may be applicable to the annular torsional flexure 16 described herein.

The inner mount surface 20, the plurality of flexures 22, and the outer mount surface 24 may be configured as a single integral piece. The deroll control system 10 also includes at least one drive 30, depicted schematically in FIGS. 1 and 2, with some embodiments described in more detail below. The drive 30 is coupled to the inner mount surface 20 of the annular torsional flexure 16 and configured to cause a counter-rotation of the inner mount surface 20 and the detector 12 about a central rotational axis 26 extending perpendicular to the image plane to correct a rotation of the image as the detector 12 is capturing the image. The deroll control system 10 also includes a controller 40 for controlling the at least one drive 30.

The controller 40 may include, for example, software executed on a processor or other device, and/or hardware, such as a processor, field-programmable gate array (FPGA), integrated circuit, or the like. As used herein, software includes, but is not limited to, one or more computer or processor instructions that can be read, interpreted, compiled, and/or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software also may be implemented in a variety of executable or loadable forms including, but not limited to, a stand-alone program, a function call (local or remote), a servlet, and an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or computer-executable instructions can be located in one logic or distributed between two or more communicating, co-operating, or parallel processing logics and thus can be loaded or executed in series, parallel, massively parallel and/or other manners.

In addition, in other embodiments, the controller 40 may be implemented in a hardware circuit(s) or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

Figure 3A:
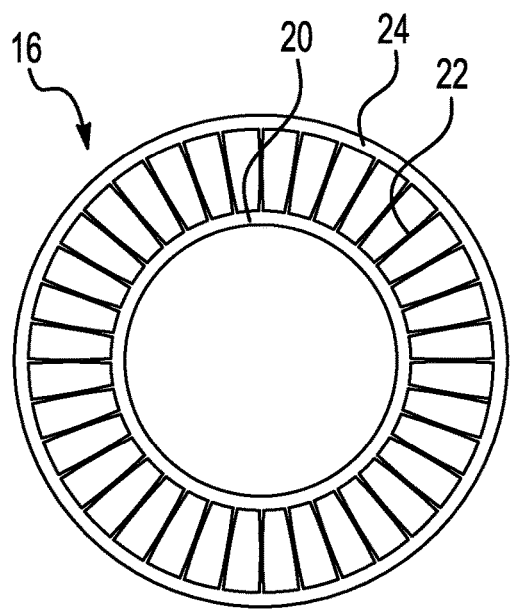
FIG. 3A is a planar view of an annular torsional flexure of the deroll control system of FIGS. 1 and 2 in a first, relaxed state.
Figure 3B:
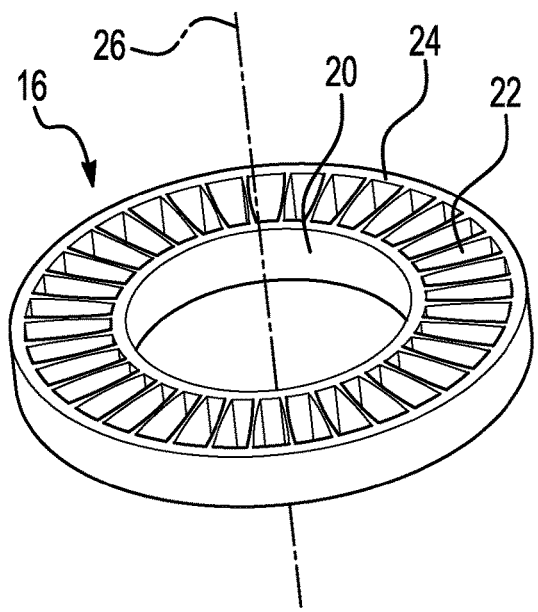
FIG. 3B is a perspective view of the annular torsional flexure of FIG. 3A.
Figure 4A:
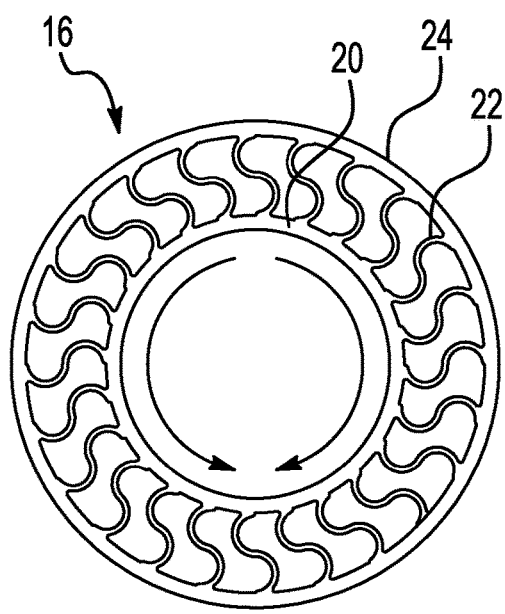
FIG. 4A is a planar view of an annular torsional flexure of the deroll control system of FIGS. 1 and 2 in a second, flexed state.
Figure 4B:
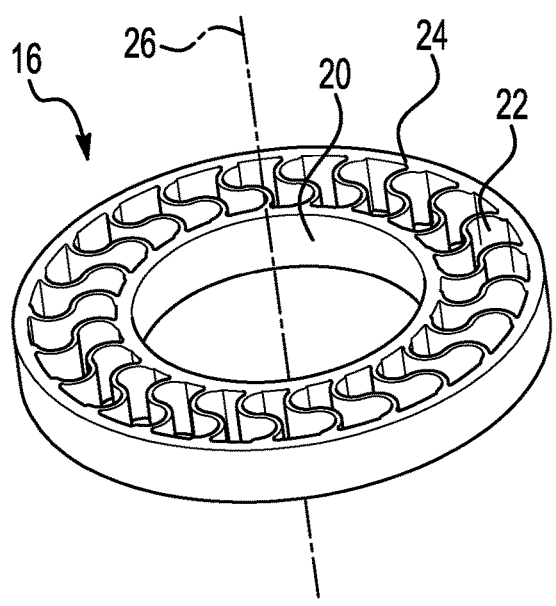
FIG. 4B is a perspective view of the annular torsional flexure of FIG. 4A.

With reference to FIGS. 3A-4B, the plurality of flexures 22 of the annular torsional flexure are configured to bend and flex to allow the inner mount surface 20, including the detector 12 which is hard mounted thereto, to rotate relative to the outer mount surface 24 about the central rotational axis 26 upon action of the at least one drive 30. For example, FIGS. 3A and 3B depict the annular torsional flexure 16 in a first, resting state in which the plurality of flexures 22 are un-flexed. In this state of the annular torsional flexure 16, the detector 12 that is hard mounted to the inner mount surface 20 (not pictured) is in a nominal, or resting position. As the detector 12 is capturing the image (integration time), a rotation of the image may be induced. To correct this induced image rotation in the resultant image, the at least one drive 30 is configured to cause a counter-rotation of the inner mount surface 20 and detector 12 mounted thereto. The counter-rotation may be in either a clockwise or counter-clockwise direction, depending on the induced image rotation that occurs as the detector 12 is capturing the image. For example, FIGS. 4A and 4B depict the annular torsional flexure 16 in a second, flexed state upon action of the at least one drive 30, in which the plurality of flexures 22 are each bent and flexed. Although FIGS. 4A and 4B depict each of the plurality of flexures 22 bent and flexed in a serpentine pattern, it is understood that each of the plurality of flexures 22 may bend or flex in alternative patterns or shapes. Additionally, it is understood that the amount of flex of each of the plurality of flexures shown in FIGS. 4A and 4B is exaggerated for purposes of illustration. In this state of the annular torsional flexure 16, the inner mount surface 20 and detector 12 are counter-rotated relative to the outer mount surface 24 to correct the induced image rotation as the detector 12 is capturing the image.

The deroll control system 10 may additionally include a position feedback coupled to the at least one drive. The position feedback is configured to at least one of monitor and adjust the counter-rotation of the inner mount surface 20 and the detector 12. After the counter-rotation of the inner mount surface 20 and the detector 12 by the at least one drive 30, the return force of each of the plurality of flexures 22 in the flexed state operates to return the inner mount surface 20 and the detector 12 mounted thereto back to the nominal position.

Figure 5:
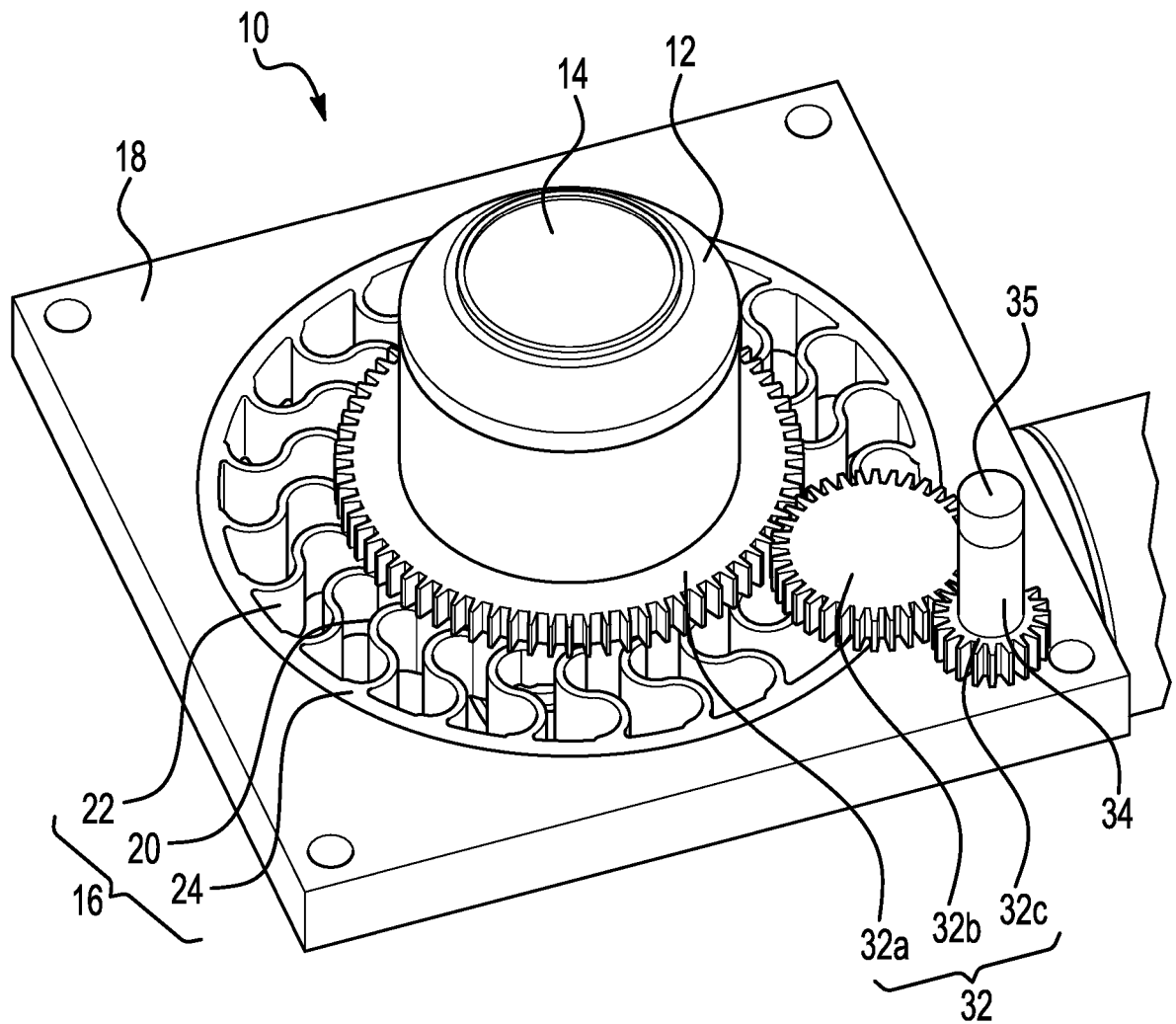
FIG. 5 is a perspective view of an exemplary deroll control system including an exemplary drive.

The at least one drive 30 may be one of a variety of types. For example, with reference to FIG. 5, the at least one drive 30 may include a gear train 32 including a plurality of gears 32a-c. A gear train motor 34 imparts a rotational force on a primary gear 32a which then transfers rotational force along the gear train to a terminal gear 32c. The gear train motor 34 may be a DC motor having a built-in encoder 35 for the position feedback. The terminal gear 32c is fixed to the inner mount surface 20 of the annular torsional flexure 16 such that the gear train 32 causes the counter-rotation of the inner mount surface 20 and the detector 12 about the central rotational axis, as described above. The size of the gear train 32 and each gear 32a-c individually is dependent on the particular design of the deroll control system 10, for example how large of a roll angle that is to be corrected and the particular degree of accuracy desired. The gear train 32 is designed to sufficiently meet the requirements of the system, including roll angle, roll rate, and control accuracy.

Figure 6:
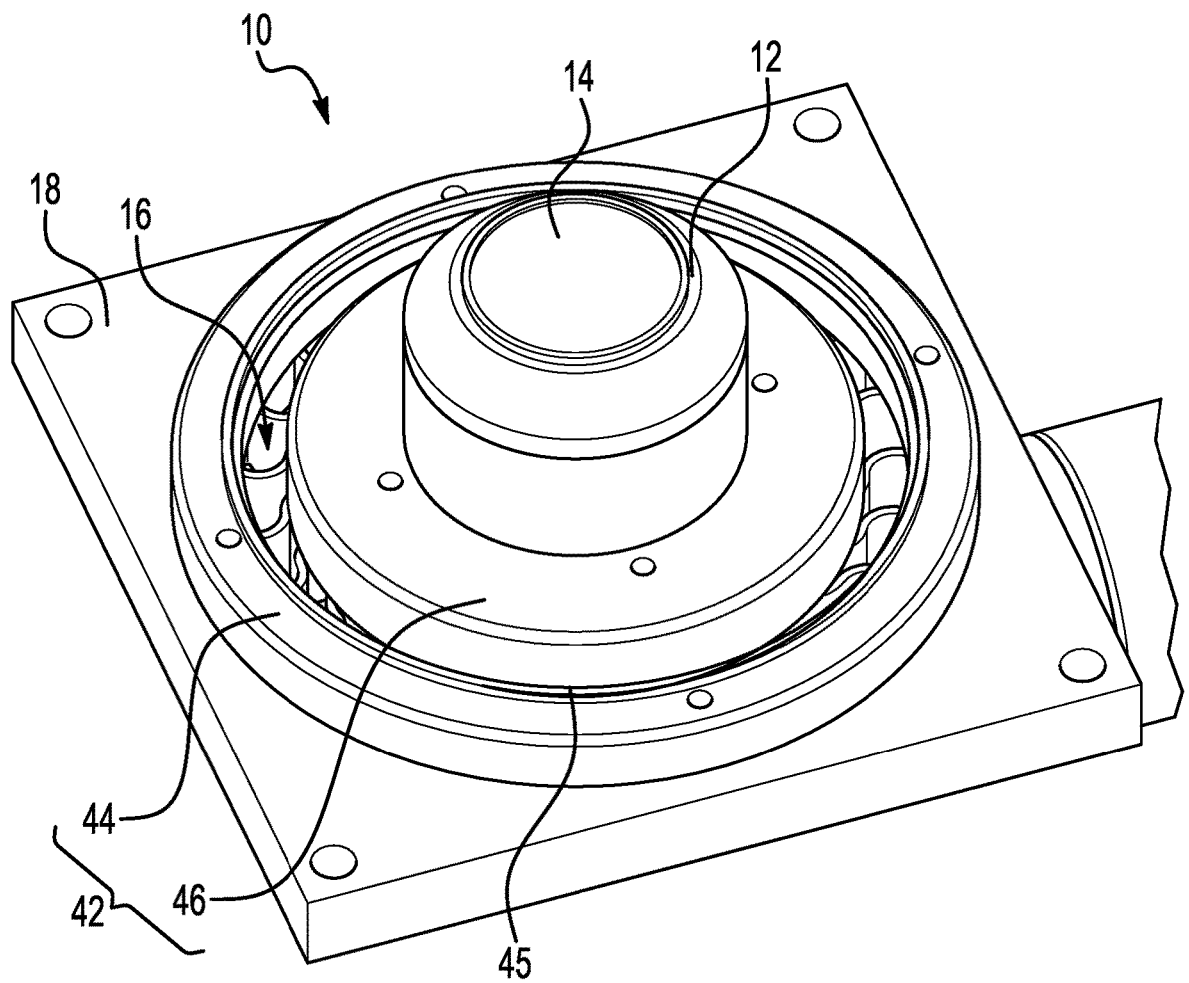
FIG. 6 is a perspective view of another exemplary deroll control system including another exemplary drive.

In another embodiment depicted in FIG. 6, the at least one drive 30 may include a direct drive motor 42. The direct drive motor 42 may include a stator 44 that is fixed to the outer housing 18 and a rotor 46 that is fixed to the inner mount surface 20 of the annular torsional flexure 16. In this manner, the direct drive motor 42 causes the counter-rotation of the inner mount surface 20 and the detector 12 about the central rotational axis, as described above. The size of the direct drive motor 42 will depend on the particular type and size of detector being used as well as the desired roll rates. For example, the direct drive motor 42 may be relatively small if it only needs to move a small detector 12, or the direct drive motor 42 may be larger if it needs to move a larger detector 12. It is understood that the gap between the stator 44 and the rotor 46 in FIG. 6 is exaggerated to show that they are separate, such that the rotor 46 can rotate as the stator 44 is stationary. In this embodiment, the position feedback of the deroll control system 10 may include a resolver 45 built into the direct drive motor 42. The resolver 45 is configured to measure a degree of the counter-rotation of the inner mount surface 20 and the detector 12 by the at least one drive 30.

Figure 7:
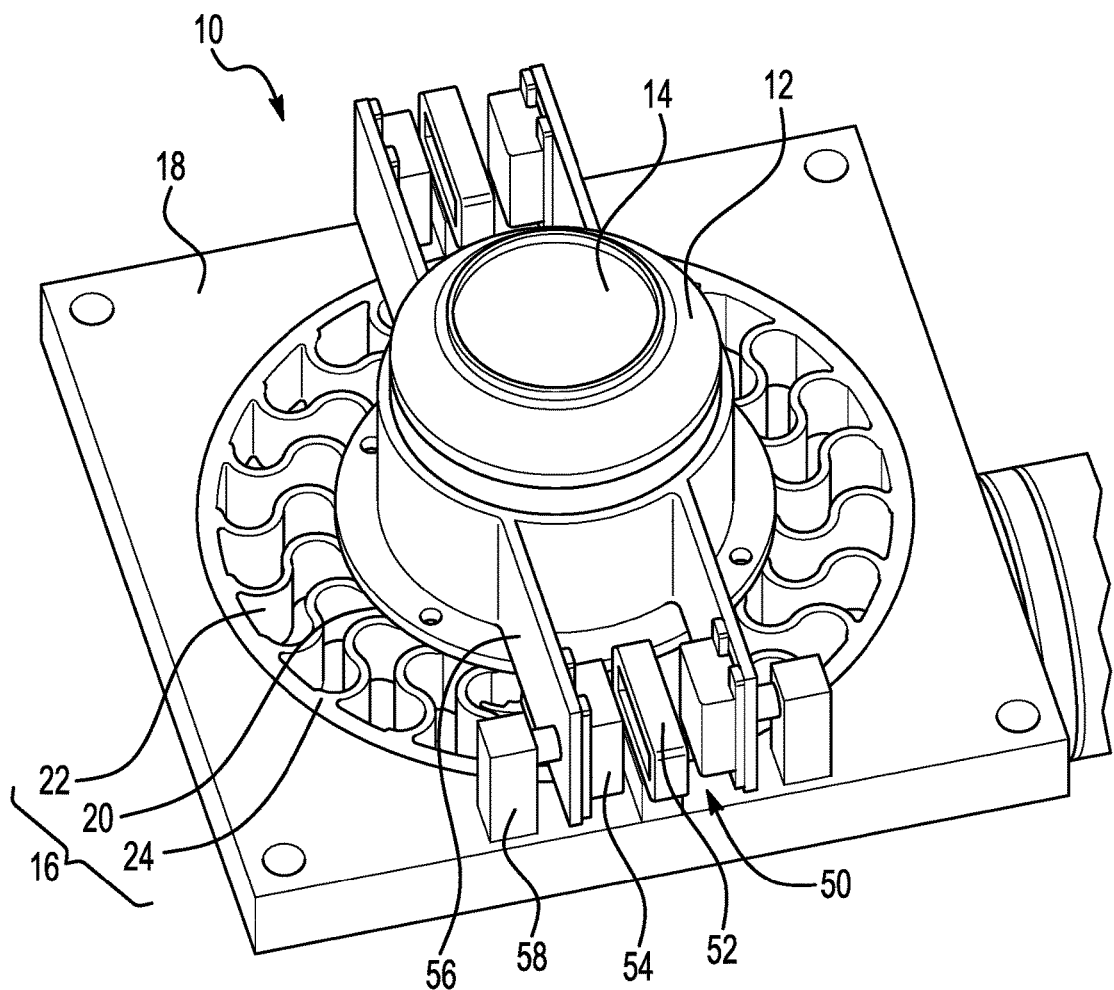
FIG. 7 is a perspective view of yet another exemplary deroll control system including yet another exemplary drive.

The at least one drive 30 may alternatively include an electric linear actuator 50, as depicted in FIG. 7. The electric linear actuator 50 includes a copper coil 52 fixed to the outer housing 18 and a plurality of permanent magnets 54 fixed to a bracket 56 that is fixed to the inner mount surface 20 of the annular torsional flexure 16. The size of the electric linear actuator 50 will depend on, for example, how much weight they need to move and at what rates and control accuracy they need to move it. For example, the electric linear actuator 50 may fit within a 32.77 cubic centimeter volume. In this embodiment, the position feedback may include at least one eddy current sensor 58 fixed to the outer housing 18.

Figure 8:
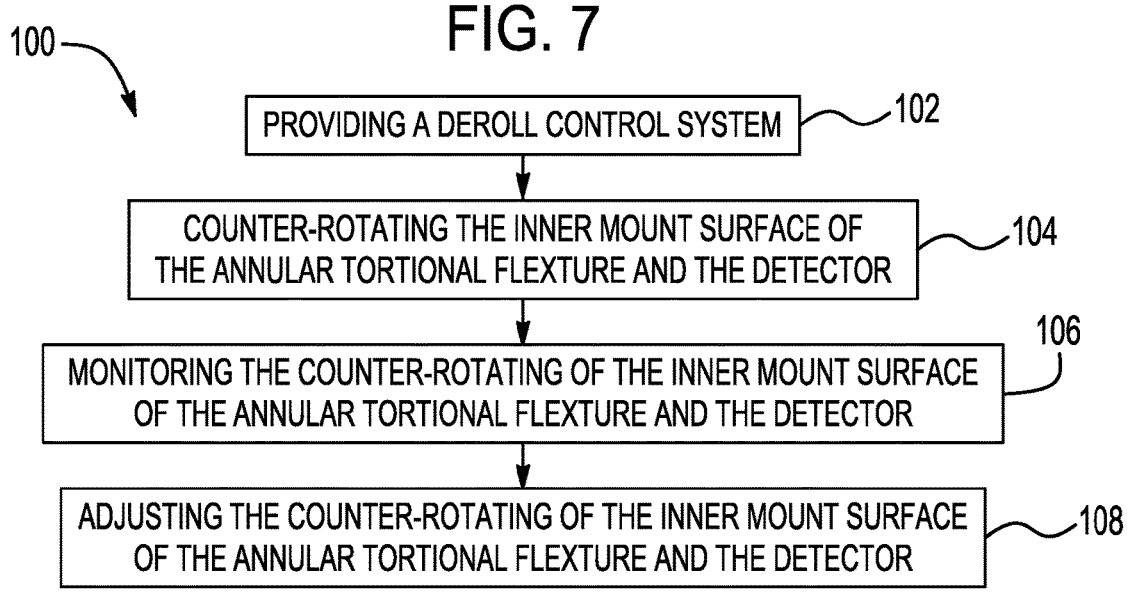
FIG. 8 is a flowchart of a method of correcting a rotation of an image captured by a detector as the detector is capturing an image.

With reference to FIG. 8, a method 100 of correcting a rotation of an image captured by a detector as the detector is capturing the image is depicted. Specifically, the method 100 includes a step 102 of providing a deroll control system, such as that described herein (FIGS. 1-7). For example, the deroll control system includes an annular torsional flexure having a rotatable inner mount surface to which the detector is mounted. The annular torsional flexure also includes a fixed outer mount surface fixed to an outer housing and spaced radially apart from the rotatable inner mount surface. The annular torsional flexure also includes a flexure region having a plurality of flexures spaced radially between the inner mount surface and the outer mount surface. The deroll control system further includes at least one drive coupled to the inner mount surface of the annular torsional flexure and a controller configured to control the at least one drive.

The method 100 then includes a step 104 of counter-rotating, via the at least one drive, the inner mount surface of the annular torsional flexure and the detector about a central rotational axis. The central rotational axis is perpendicular to an image plane of the detector. The method 100 may additionally include a step 106 of monitoring the counter-rotating of the inner mount surface of the annular torsional flexure and the detector with a position feedback coupled to the at least one drive. The method 100 may additionally include a further step 108 of adjusting the counter-rotating of the inner mount surface of the annular torsional flexure and the detector with the position feedback coupled to the at least one drive.

In an embodiment of the method 100, the step 104 of counter-rotating may include rotating the inner mount surface of the annular torsional flexure and the detector with a gear train and a gear train motor, as described above with the deroll control system 10 of FIG. 5. In this embodiment, a terminal gear of the gear train is fixed to the inner mount surface of the annular torsional flexure. In another embodiment of the method 100, the step 104 of counter-rotating may include rotating the inner mount surface of the annular torsional flexure and the detector with a direct drive motor, as described above with the deroll control system 10 of FIG. 6. In this embodiment, a stator of the direct drive motor is fixed to the outer housing and a rotor of the direct drive motor is fixed to the inner mount surface of the annular torsional flexure. Finally, in another embodiment of the method 100, the step 104 of counter-rotating may include rotating the inner mount surface of the annular torsional flexure and the detector with an electric linear actuator, as described above with the deroll control system 10 in FIG. 7. In this embodiment, a copper coil is fixed to the outer housing and a plurality of permanent magnets are fixed to a bracket that is fixed to the inner mount surface of the annular torsional flexure.

The step 106 of monitoring the counter-rotating of the inner mount surface of the annular torsional flexure and the detector with the position feedback may include measuring a degree of the counter-rotation of the inner mount surface and the detector with a resolver built into the at least one drive. Alternatively, the step 106 of monitoring the counter-rotating of the inner mount surface of the annular torsional flexure and the detector with the position feedback may include measuring eddy currents of the electric linear actuator with at least one eddy current sensor fixed to the outer housing.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:
1. A deroll control system comprising:
an outer housing;
a detector configured to capture an image;
an annular torsional flexure having a rotatable inner mount surface to which the detector is mounted, a fixed outer mount surface fixed to the outer housing and spaced radially apart from the rotatable inner mount surface, and a flexure region having a plurality of flexures annularly spaced from each other and each extending radially between the inner mount surface and the outer mount surface;
at least one drive coupled to the inner mount surface of the torsional flexure and configured to cause a counter-rotation of the inner mount surface and the detector about a central rotational axis to correct a rotation of the image as the detector is capturing the image; and a controller configured to control the at least one drive;
wherein the annular torsional flexure is configured to allow the counter-rotation of the inner mount surface and the detector and prevent movement of the inner mount surface and the detector in a tilt direction.

2. The deroll control system according to claim 1, further comprising a position feedback coupled to the at least one drive and configured to at least one of monitor and adjust the counter-rotation of the inner mount surface and the detector.

3. The deroll control system according to claim 2, wherein the position feedback includes a resolver built into the at least one drive and configured to measure a degree of the counter-rotation of the inner mount surface and the detector by the at least one drive.

4. The derail control system according to claim 1, wherein the at least one drive includes a gear train and a gear train motor, the gear train operatively coupled to the gear train motor.

5. The deroll control system according to claim 4, wherein a terminal gear of the gear train is fixed to the inner mount surface of the annular torsional flexure.

6. The derail control system according to claim 1, wherein the at least one drive includes a direct drive motor.

7. The deroll control system according to claim 6, wherein the direct drive motor includes a stator fixed to the outer housing and a rotor fixed to the inner mount surface of the annular torsional flexure.

8. The deroll control system according to claim 1, wherein the at least one drive includes an electric linear actuator.

9. The deroll control system according to claim 8, wherein the electric linear actuator includes a copper coil fixed to the outer housing and a plurality of permanent magnets fixed to a bracket that is fixed to the inner mount surface of the annular torsional flexure.

10. The deroll control system according to claim 8, wherein the position feedback includes at least one eddy current sensor fixed to the outer housing.

11. The deroll control system according to claim 1, wherein the detector is a camera having a window parallel to the image plane.

12. The deroll control system according to claim 1, wherein the inner mount surface, the outer mount surface and the flexure region having the plurality of flexures are configured as a single integral piece.

13. A method of correcting a rotation of an image captured by a detector as the detector is capturing the image, the method comprising:
providing a deroll control system including an annular torsional flexure having a rotatable inner mount surface to which the detector is mounted, a fixed outer mount surface fixed to an outer housing and spaced radially apart from the rotatable inner mount surface, and a flexure region having a plurality of flexures annularly spaced from each other and extending radially between the inner mount surface and the outer mount surface, the deroll control system further including at least one drive coupled to the inner mount surface of the torsional flexure and a controller configured to control the at least one drive, and
counter-rotating, via the at least one drive, the inner mount surface of the annular torsional flexure and the detector about a central rotational axis, while preventing movement of the inner mount surface and the detector in a tilt direction.

14. The method according to claim 13, further comprising monitoring the counter-rotating of the inner mount surface of the annular torsional flexure and the detector with a position feedback coupled to the at least one drive.

15. The method according to claim 14, wherein the monitoring the counter-rotating of the inner mount surface of the annular torsional flexure and the detector with the position feedback includes measuring a degree of the counter-rotation of the inner mount surface and the detector with a resolver built into the at least one drive.

16. The method according to claim 14, wherein the counter-rotating includes rotating the inner mount surface of the annular torsional flexure and the detector with an electric linear actuator, wherein a copper coil is fixed to the outer housing and a plurality of permanent magnets are fixed to a bracket that is fixed to the inner mount surface of the annular torsional flexure.

17. The method according to claim 16, wherein the monitoring the counter-rotating of the inner mount surface of the annular torsional flexure and the detector with the position feedback includes measuring eddy currents of the electric linear actuator with at least one eddy current sensor fixed to the outer housing.

18. The method according to claim 13, further comprising adjusting the counter-rotating of the inner mount surface of the annular torsional flexure and the detector with the position feedback coupled to the at least one drive.

19. The method according to claim 13, wherein the counter-rotating includes rotating the inner mount surface of the annular torsional flexure and the detector with a gear train and a gear train motor, wherein a terminal gear of the gear train is fixed to the inner mount surface of the annular torsional flexure.

20. The method according to claim 13, wherein the counter-rotating includes rotating the inner mount surface of the annular torsional flexure and the detector with a direct drive motor, wherein a stator of the direct drive motor is fixed to the outer housing and a rotor of the direct drive motor is fixed to the inner mount surface of the annular torsional flexure.

* * * * *